Figure 1:
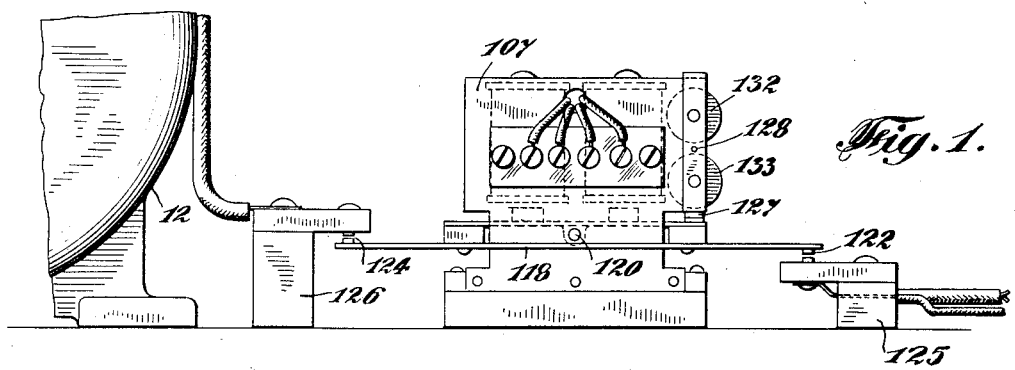

Jan. 15, 1924.  
H. E. CHIPMAN  
ELECTRIC MOTOR CIRCUIT CONTROL  
Original Filed Jan. 26, 1921

1,480,993

Inventor  
Harry E. Chipman  
J. Edmonds  
Attorney

Patented Jan. 15, 1924.

1,480,993

UNITED STATES PATENT OFFICE.

HARRY E. CHIPMAN, OF NEW HAVEN, CONNECTICUT, ASSIGNOR TO WILLIAM A. CHIPMAN AND HOWARD H. CHIPMAN, BOTH OF NEW YORK, N. Y.

ELECTRIC-MOTOR-CIRCUIT CONTROL.

Original application filed January 26, 1921, Serial No. 439,913. Divided and this application filed March 1, 1922. Serial No. 540,124.

*To all whom it may concern:*

Be it known that I, HARRY E. CHIPMAN, a citizen of the United States, residing at No. 52 Miller Street, in the city and county of New Haven, State of Connecticut, have invented certain new and useful Improvements in Electric-Motor-Circuit Controls, of which the following is a specification.

My invention relates to electric motor circuit control, and more particularly relates to electrical apparatus and system for starting and stopping an electric motor.

My present application is a division of my application Serial No. 439,913, filed January 26, 1921, talking picture transfer mechanism, wherein I have described an apparatus for printing a positive motion picture film from a negative film, and simultaneously transferring magnetic sound records from a sound record carrying ribbon associated with the negative film to a similar ribbon associated with the positive film. Said apparatus as described is adapted to be driven by a suitable motor having associated therewith means operable both manually and automatically by the film as it becomes wound upon a take-up reel to start and stop the motor. As above stated, my present invention relates to the means for starting and stopping the motor, and it is obvious that such means may be applied to many various electrical machines and is not limited to a motor associated with the talking picture transfer apparatus or the winding and reeling device illustrated and described in my said application. My objects include the provision of means which are adapted to be operated manually at any time to start or stop an electrical machine such as an electric motor; the provision of means adapted to be operated automatically at a predetermined time by an element driven by or operated upon by the machine; and the provision of means subject to both manual and automatic operation. A further object of my invention is to provide a circuit control means of said character so arranged and designed as to be operable to lock the machine against being accidentally started. Other objects will be in part obvious and in part pointed out hereinafter.

In accordance with my invention, I interpose between the machine to be controlled and a suitable source of electrical power therefor, a series of interassociated electrical circuits, including electrical relays or electromagnets and switches or push buttons, some of said switches or push buttons being intended for manual operation, and one or more of said switches being intended for automatic operation by an element operated upon by the motor. The arrangement of the circuits, switches and relays is such that the machine is started or stopped by predetermined manipulation of the switches or push buttons. My control system and means may be applied generally to the starting and stopping of electrical machines, and either the manual or the automatic stopping feature may be employed without the other, if desired or expedient.

Figure 3:
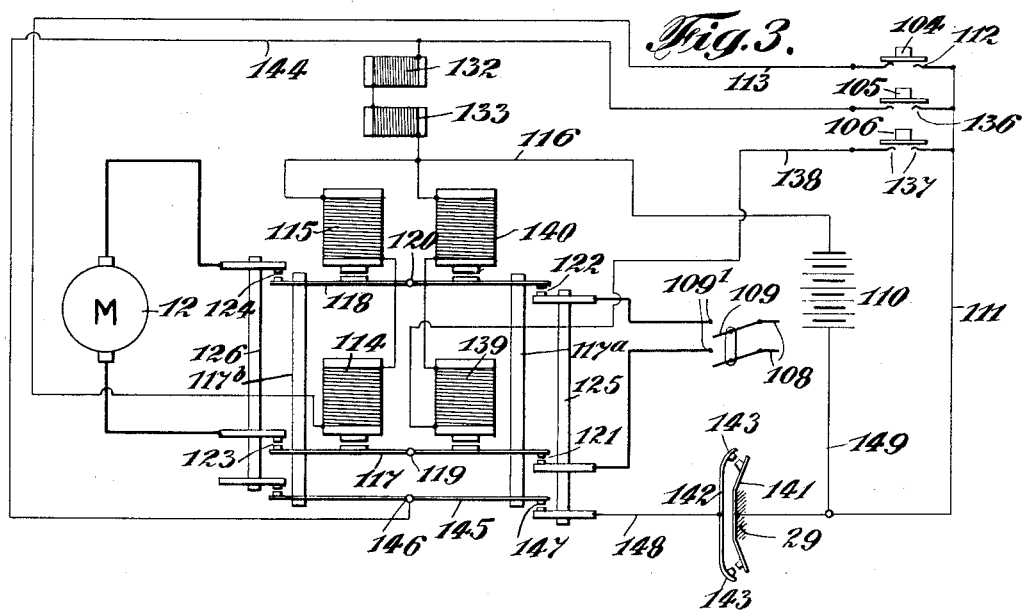
Figure 2:
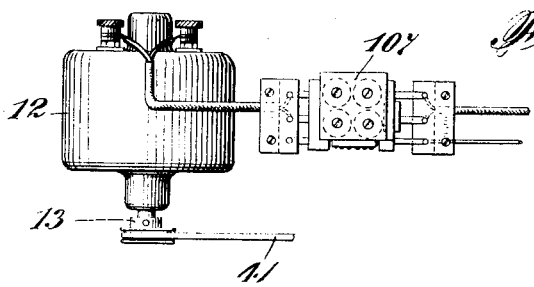
Figure 4:
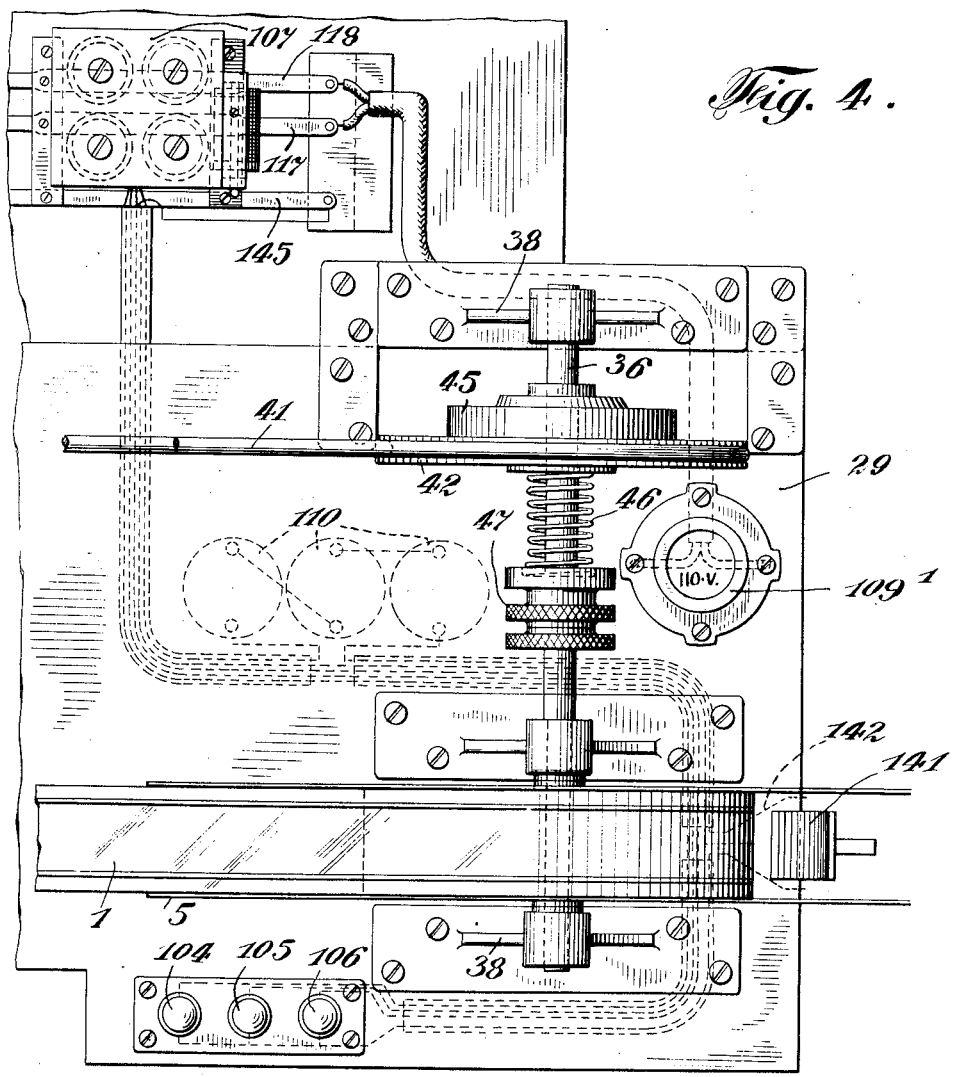
Figure 5:
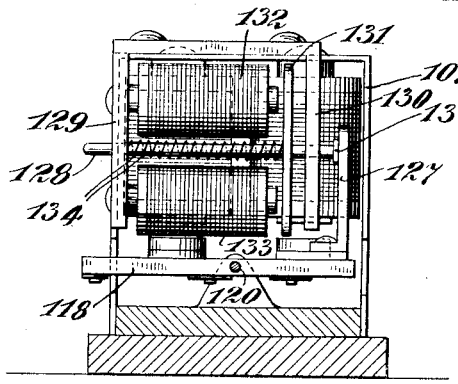

In order that a clearer understanding of my invention may be had, attention is hereby directed to the accompanying drawings forming part of this application and illustrating certain embodiments of my invention. In the drawings, Fig. 1 represents a side elevation of the relay casing or frame containing a portion of my control mechanism and associated with a motor; Fig. 2 is a top plan view of the same; Fig. 3 is a diagrammatic view of the motor starting, stopping and locking mechanism and connections; Fig. 4 is a top plan view of the control system and apparatus associated with a winding and reeling device for film, which device is adapted to be driven by the controlled motor, suitable circuits and wiring connections therefor being shown; and Fig. 5 is an end elevation of the relay mechanism contained in the relay casing or frame.

Similar reference characters refer to similar parts throughout the several views of the drawings.

Referring to the drawings, 12 represents an electric motor adapted to drive the winding or reeling device comprising a spool 5 adapted to wind upon itself a strip of motion picture film 1, which is fed from a source of supply not shown. The driving connection between the motor 12 and the spool 5, as shown, is effected by means of a belt 41 engaging a sheave 13 on the motor shaft and another sheave 42 supported upon a shaft 36 which is journaled upon supports 38 which are mounted upon a frame or table 29.

Sheave 42 is loosely mounted on shaft 36, but is frictionally secured thereto by a friction disc 45 which is secured to shaft 36, sheave 42 being pressed into engagement with disc 45 by means of a spring 46 on shaft 36, the tension of which is adjusted by a nut 47 mounted on a screw threaded portion of the shaft. Thus it will be apparent that when the motor 12 is started, spool 5 will be rotated to wind upon itself motion picture film 1.

I will now describe the circuit control means whereby the motor 12 may be started and stopped and locked against starting manually, and also whereby the motor is adapted to be stopped automatically when a predetermined quantity of film has been wound upon the spool 5. At a convenient point on table 29 three push buttons 104, 105 and 106 are arranged, in the preferred embodiment of my invention. Button 104 controls the starting of motor 12, whereupon the motor circuit is closed and latched in closed position. Button 105, when depressed, serves to trip the latching device referred to, so as to stop the motor if button 104 is in raised position. Button 106 closes a locking circuit, the actuation of which makes it impossible to start the motor until the trip button 105 has first been depressed.

These results are effected by means of a number of electro-magnets which are shown within a frame 107 adjacent to the motor.

The circuit connections for these devices are indicated in Fig. 3. Motor 12 may be operated from mains 108 by means of a plug and socket connection indicated at 109, 109′, the motor circuit being indicated in heavy lines.

Upon pressing the starting button 104, current flows from battery, or any convenient source, 110, through connection 111, thence through contacts 112 which are closed by button 104, thence through connection 113, through a pair of electro-magnets 114 and 115, in series, and thence by connection 116 back to battery. Electro-magnets 114 and 115, upon being energized, attract their armatures which are secured respectively upon levers 117 and 118 which are pivoted respectively at 119 and 120. The right hand ends of levers 117 and 118 are accordingly depressed to close contact at 121 and 122 and their left hand ends are raised to close contact at 123 and 124, the stationary contacts of the two pairs referred to being carried by standards of insulating material 125 and 126. Levers 117 and 118 are of conducting material and the motor circuit is accordingly established through levers 117 and 118 and the contacts which have just been closed, as above described.

Referring to Fig. 5, one of the levers 117 or 118 is provided at its right hand end with an upwardly extending member 127, A horizontal pin 128 is slidably mounted in a pair of vertical frame members 129 and 130 of the relay casing 107. This pin carries an armature 131 which is adapted to coact with the electro-magnets 132 and 133. A spiral spring 134 surrounds pin 128 and bears against armature 131, to press the pin to the right, referring to Fig. 5. When so pressed, and when the armature levers 117 and 118 are in neutral position, the forward end of pin 128 bears against the face of a boss 135 on the vertical extension 127.

When starting, button 104 has been depressed, to energize electro-magnets 114 and 115, the vertical member 127 will be lowered so that the forward end of pin 128 will be forced by spring 134 over the top of boss 135. Accordingly, levers 117 and 118 will be locked in the positions in which the same have been swung by the energizing of electro-magnets 114 and 115, and the connections of the motor circuit will remain closed after the starting button 104 has been released. It will be noted that the armature levers indicated at 117 and 118 are rigidly connected to swing together, as by connecting strips 117$^a$ and 117$^b$ of insulating material.

When the motor is to be stopped, button 105 is depressed whereupon circuit is completed from battery 110 through connection 111 and the spring contacts 136 of button 105, and through electro-magnets 132 and 133 and back to battery by connection 116. The electro-magnets 132 and 133 being energized attract their armature 131 whereupon pin 128 is withdrawn from its latching position above lug 135, and levers 117 and 118 swing back into their neutral positions breaking the motor circuit.

It is sometimes desirable to prevent operation of the apparatus, in which case button 106 is depressed to close contact across the spring contacts 137.

When button 106 is depressed, current will flow from battery 110, through conductor 11, contacts 137, conductor 138, electro-magnets 139 and 140, in series, and back to battery through conductor 116. The energization of electro-magnets 139 and 140 raises arm 127 (Fig. 5) above its normal position so that the end of pin 128 will catch under the boss 135 thereby locking armature levers 117 and 118 in a position in which the motor circuit is open and cannot be closed by depressing button 104. In order to operate the apparatus it is accordingly necessary to depress the trip button 105 whereupon electro-magnets 132 and 133 will be energized to withdraw pin 128 from its engagement with lug 135, thus permitting armature levers 117 and 118 to return to their neutral positions.

An automatic stop should also be provided to prevent further winding of the film when reel 5 becomes filled to a desired extent. Accordingly a stationary contact member 141 is provided, and also a contact member 142 comprising a spring strip, the upper or lower ends of which, 143, are adapted to be engaged by the film wound up on reel 5, when the reel has been filled. The contact members mentioned may be carried by table 29 as is indicated in Fig. 4.

Members 141 and 142 are provided with contact points at their ends, the contacts being brought together when the reel is filled. When this occurs the circuit will be completed to energize the trip magnets 132 and 133. In such a case current flows from battery 110 through conductor 116, electro-magnets 133 and 132, thence through conductor 144, lever 145 which is pivotally mounted at 146, contacts 147, conductor 148, contacts on members 142 and 141, and thence by conductor 149 back to battery. It will be understood that lever 145 moves with levers 117 and 118 and may be connected thereto by strips 117ª and 117ᵇ of insulating material, previously referred to. Accordingly, when button 104 has been actuated, contacts 147 will be closed. The result of energizing electro-magnets 132 and 133 will be to unlatch pin 128 from boss 135 so as to open the motor circuit as previously explained.

It is thought that the operation of the device will be entirely clear from the above description. It should be understood that my invention is not limited strictly to the details of construction described but is as broad as is indicated by the accompanying claims, and also that my invention includes various sub-combinations of elements which are set forth in some of the claims.

What I claim is:—

1. In apparatus of the character described, the combination of a motor, an electro-magnet having a pivoted armature, a source of power, a switch-controlled circuit for energizing said electro-magnet, spring-controlled means for latching said armature in its attracted position, means for tripping the latch, and a power circuit for said motor including said armature and a pair of normally-open contacts which are closed when said armature is swung into its attracted position.

2. In apparatus of the character described, the combination of a motor, an electro-magnet having a pivoted armature, a source of power, a switch-controlled circuit for energizing said electro-magnet, means, including a spring-pressed pin, for latching said armature in its attracted position, a second electro-magnet having an armature secured to said pin, a power circuit for said motor including said first armature and a normally open contact which is closed when said armature is swung into its attracted position, and a switch-controlled circuit for energizing said second electro-magnet to retract said pin from latched position.

3. In apparatus of the character described, the combination of a motor, a pair of electro-magnets, a centrally-pivoted arm carrying armatures for said electro-magnets on opposite sides of its pivot, contacts closed by opposite ends of said arm when the same is swung in one direction, a power circuit for said motor, including said arm and contacts, a switch-controlled circuit for energizing the first electro-magnet to swing said arm into circuit-closing position, a switch-controlled circuit for energizing the second electro-magnet to swing said arm in the opposite direction, and means for latching said arm in both extreme positions.

4. In apparatus of the character described, the combination of a motor, a pair of electro-magnets, a centrally-pivoted arm carrying armatures for said electro-magnets on opposite sides of its pivot, contacts closed by opposite ends of said arm when the same is swung in one direction, a power circuit for said motor, including said arm and contacts, a switch-controlled circuit for energizing the first electro-magnet to swing said arm into circuit-closing position, a switch-controlled circuit for energizing the second electro-magnet to swing said arm in the opposite direction, an extension on said arm, carrying an abutment, a spring-pressed pin adapted to extend over or under said abutment when said arm is swung in either the first or the opposite direction, to latch the same, an electro-magnet having an armature secured to said pin, and a switch-controlled circuit for energizing said last electro-magnet to retract said pin from either latching position.

This specification signed and witnessed this 23 day of February, 1922.

HARRY E. CHIPMAN.

Witnesses:
PAUL F. BEETZ,
IDA RAISEN.